United States Patent Office 3,514,471
Patented May 26, 1970

3,514,471
PROCESS FOR THE MANUFACTURE OF 3-PHENYL OR SUBSTITUTED PHENYL-7-AMINO-CUMARINS
Takao Yanagisawa, Izumiohtsu, and Osamu Kotoyori, Sennan-gun, Japan, assignors to Showa Kagaku Kogyo Kabushiki Kaisha, Kawanishi, Hyogo Prefecture, Japan
No Drawing. Filed May 23, 1968, Ser. No. 731,625
Int. Cl. C07d 7/28
U.S. Cl. 260—343.2          12 Claims

ABSTRACT OF THE DISCLOSURE 3-phenyl or substituted phenyl-7-amino-cumarins of the formula:

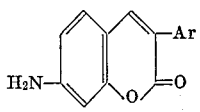

wherein Ar is a phenyl or substituted phenyl group, are made by the following steps, (1) nitrotoluene derivative of the formula:

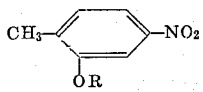

wherein R is a lower alkyl group, is treated with an alkali metal polysulfide such as potassium polysulfide in an alcohol such as methanol or ethanol to make amino benzaldehyde derivative of the formula:

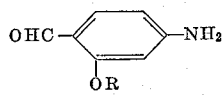

wherein R has the meaning stated before, (2) the resulting reaction mixture without separating off the amino benzaldehyde derivative is reacted with phenylacetic acid, substituted phenylacetic acid or its derivative to make acrylic acid derivative of the formula:

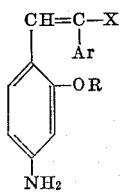

wherein X is —COOH, —COOR or —CN, R is a lower alkyl group and Ar is a phenyl or substituted phenyl group, (3) alkoxy group of the acrylic acid derivative thus obtained is hydrolyzed to convert into free hydroxy group, and (4) the product formed is finally treated in an acidic medium such as acetic acid or sulfuric acid to affect ring closure in order to obtain the desired products.

According to the invention, the desired products which are useful intermediates for the preparation of fluorescent brightening agents are readily obtained in industrial application by using cheap and readily obtainable starting materials.

The present invention relates to novel process for manufacturing 3 - phenyl or substituted phenyl - 7 - amino-cumarins.

3-phenyl or substituted phenyl-7-amino-cumarins are useful intermediates for preparing fluorescent brightening agents. According to prior art, they have been prepared by condensing 4 - acetylamino-2-methoxy-benzaldehyde with benzyl cyanide or substituted benzyl cyanide, by demethylating the methoxy group present in the resulting α-phenyl or substituted phenyl-β-(2-methoxy-4-acetyl-amino-phenyl)-acrylonitrile, by ring-closing in an acidic medium to prepare 3-phenyl-7-acetylaminocumarin and then by converting acetylamino group in 7-position into free amino group by hydrolysis. Another prior art method of preparation is by treating (4-acetylamino-salicylidene)-aniline with phenylacetic acid in the presence of acetic anhydride or sodium acetate at elevated temperature and then hydrolysing 3-phenyl-7-acetylaminocumarin thus obtained.

In these methods, starting materials are fairly difficult to obtain and furthermore, it is necessary to protect amino group in 4-position such as by converting it into acyl group. Therefore, it is needed to eliminate off the acyl group by hydrolysis in the final step in order to obtain the desired materials, so that they are not considered to be advantageous procedures in industrial application owing to complicated processes.

The present invention was achieved through attempts to manufacture 3-phenyl-7-amino-cumarins by simple procedures using inexpensive starting materials.

According to the invention, 3-phenyl or substituted phenyl-7-amino-cumarins are obtained by treating nitrotoluene derivative of the formula:

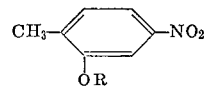

wherein R is a lower alkyl, and especially methyl group is suitable because of its being readily obtainable, with an alkali metal polysulfide in an alcohol, reacting the resulting amino benzaldehyde derivative of the formula:

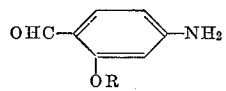

wherein R has the meaning stated before, with phenylacetic acid, substituted phenylacetic acid or its derivative to make acrylic acid derivative of the formula:

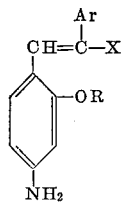

wherein X is —COOH, —COOR or —CN, R is a lower alkyl, and Ar is a phenyl or substituted phenyl group, hydrolyzing alkoxy group of the compound to convert into free hydroxy group, and then affecting ring-closure of the compound thus obtained in an acidic medium.

Phenylacetic acid derivatives used in the invention are, for example, lower alkyl esters of phenylacetic acid or phenylacetic acid nitrile. Typical substituted phenylacetic acids or their derivatives include tolyl acetic acid or chloro-, methoxyacetylamino-, nitro-, methylsulfonyl-, sulfonamido- or trimethylamino-phenylacetic acids or their lower alkyl esters, nitriles and so on.

In the invention, said phenylacetic acid or substituted phenylacetic acids are especially suitable to use as nitriles.

Alcohols employed as reaction mediums include methanol, ethanol, propanol, isopropanol and so on.

Alkali metal polysulfides used in the reaction are polysulfides of potassium, sodium, lithium, rubidium and so on, and amoung them potassium and sodium polysulfides are particularly preferable to employ since they are cheap.

In the case of making acrylic acid derivatives according to the invention, 2-alkoxy-4-nitrotoluene is typically dissolved in an alcohol, and an aqueous solution containing alkali metal sulfide is added dropwise to the solution while boiling, and into the reaction mixture containing 2-alkoxy-4-amino-benzaldehyde thus obtained, phenylacetic acid, substituted phenylacetic acid or its derivative such as benzyl cyanide is added suddenly and the mixture is condensed.

In account of the invention, it is characterized in that phenylacetic acid or its derivative is added suddenly to 2-alkoxy-4-amino-benzaldehyde which is obtained by treating 2-alkoxy-4-nitrotoluene with alkali metal polysulfide in an alcohol but not separated off from the reaction mixture. Resultingly, acrylic acid derivatives of the formula:

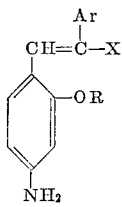

are manufactured in extremely high yields without any side reaction using 2-alkoxy-4-amino-benzaldehyde as a starting material which is presumed to be a reactive one and to cause side reactions.

Alkoxy group of the acrylic acid derivatives thus obtained is hydrolyzed to convert into free hydroxy group, and consequently boiled in an acidic medium such as lower aliphatic acid, hydrogen halide solution or sulfuric acid to ring-close in order to make the desired cumarin derivatives.

2-alkoxy group may be hydrolyzed by conventional means such as by treating with anhydrous aluminum chloride in an inert organic solvent.

Owing to the invention, 3-phenyl-7-amino-cumarin derivatives used as intermediates for the preparation of fluorescent brightening agents can be readily obtained by using cheap and easily obtainable starting materials.

The present invention will be more fully illustrated by the following examples.

EXAMPLE 1

A solution consisting of 18 g. of crystalline sodium sulfide, 16.5 g. of sodium hydroxide, 8.5 g. of sulfur and 200 g. of water is added over a period of about 2 hours to 200 g. of 95% alcohol solution containing 30 g. of 2-methoxy-4-nitrotoluene with stirring and boiling, and the mixture is further stirred for 6 hours at the same temperature and cooled to 40° C. Into the solution, 21.1 g. of benzyl cyanide is added, stirred for 3 hours at the same temperature, cooled to form a precipitate and filtered, and the precipitate formed is washed with water and a bit of ethanol to give 25.5 g. of α-phenyl-β-(2-methoxy-4-aminophenol)-acrylonitrile as yellow needle crystal melting at 138–139° C.

The product is dispersed to 210 g. of benzene with stirring, and subsequently 66 g. of anhydrous aluminum chloride powder is added, refluxed for 4 hours, cooled, and then 360 g. of glacial acetic acid and 36 g. of conc. hydrochloric acid are added, steam distilled to remove benzene, filtered and then washed with water. Aminocumarin HCl salt so formed is dispersed in 500 cc. of water, neutralized with soda ash solution to become pH 7 with stirring, and the crystal formed is filtered, washed with water and then dried. This affords 23.5 g. of yellow crystals of 3-phenyl-7-aminocumarin melting at 203–204° C.

EXAMPLE 2

A solution consisting of 18 g. of crystalline sodium sulfide, 16.5 g. of sodium hydroxide, 8.5 g. of sulfur and 200 g. of water is added over a period of about 2 hours dropwise to 200 g. of 95% isopropanol containing 30 g. of 2-methoxy-4-nitrotoluene with stirring and boiling and the mixture is further stirred for 6 hours at the same temperature, cooled to 40° C., and 23.6 g. of p-methyl benzylcyanide is added, stirred for 3 hours at the same temperature and then treated using the procedure given in Example 1. This yields 19.8 g. of 3-p-tolyl-7-amino cumarin melting at 220–223° C.

EXAMPLE 3

A solution consisting of 18 g. of crystalline sodium sulfide, 16.5 g. of sodium hydroxide, 8.5 g. of sulfur and 200 g. of water is added dropwise over a period of about 2 hours to 200 g. of 95% methanol containing 30 g. of 2-methoxy-4-nitrotoluene with stirring and boiling and the mixture is further stirred for 6 hours at the same temperature, cooled to 40° C., and 27.3 g. of p-chlorobenzyl cyanide is added. The resulting solution is further treated for 3 hours at the same temperature and then treated using the same procedure given in Example 1 to give 21.0 g. of 3-p-chlorophenyl-7-amino-cumarin melting at 259–261° C.

Similarly, 22.2 g. of p-methoxyphenyl-7-amino-cumarin melting at 252–254° C. is obtained by using 26.5 g. of p-methoxy-benzyl cyanide in place of p-chlorobenzyl cyanide used in the above example.

We claim:

1. Process for the production of a compound of the formula

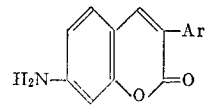

wherein Ar is a member selected from the group consisting of phenyl, tolyl, chlorophenyl, methoxyphenyl, acetylaminophenyl, nitrophenyl, methylsulfonylphenyl, sulfonamidophenyl and trimethylaminophenyl, which comprises reacting a compound of the formula

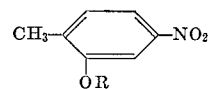

wherein R is a lower alkyl group with an alkali metal polysulfide, reacting the resultant amino benzaldehyde derivative with a member selected from the group consisting of phenylacetic acid, tolyl acetic acid, chlorophenylacetic acid, methoxylphenylacetic acid, acetylaminophenylacetic acid, nitrophenylacetic acid, methylsulfonylacetic acid, sulfonamidophenylacetic acid, trimethylaminophenylacetic acid and their lower alkyl esters and nitriles, to yield a compound of the formula

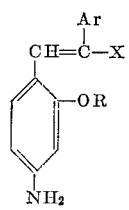

wherein
X is a member selected from the group consisting of COOH, COOR and CN,
R is a lower alkyl group and
Ar is a member selected from the group consisting of phenyl, tolyl, chlorophenyl, methoxyphenyl, acetylaminophenyl, nitrophenyl, methylsulfonylphenyl, sulfonamidophenyl and trimethylaminophenyl, hydrolyzing the —OR group of Formula 2 and reacting the resultant product with an acidic medium.

2. Process as in claim 1, wherein R of Formula 1 is a methyl group.

3. Process as in claim 1, wherein the amino benzaldehyde derivative is reacted with benzyl cyanide.

4. Process as in claim 1, wherein, the amino benzaldehyde derivative is reacted with p-methylbenzyl cyanide.

5. Process as in claim 1, wherein the alkali metal polysulfide is a member selected from the group consisting of sodium polysulfide and potassium polysulfide.

6. Process as in claim 1, wherein the compound of Formula 1 is mixed with a member selected from the group consisting of methanol, ethanol, propanol and isopropanol prior to reacting with the alkali metal polysulfide.

7. Process as in claim 1, wherein the resultant material is not separated from the reaction system.

8. Process as in claim 2, wherein the alkali metal polysulfide is a member selected from the group consisting of sodium polysulfide and potassium polysulfide.

9. Process as in claim 3, wherein the alkali metal polysulfide is a member selected from the group consisting of sodium polysulfide and potassium polysulfide.

10. Process as in claim 4, wherein the alkali metal polysulfide is a member selected from the group consisting of sodium polysulfide and potassium polysulfide.

11. Process as in claim 6, wherein the alkali metal polysulfide is a member selected from the group consisting of sodium polysulfide and potassium polysulfide.

12. Process as in claim 7, wherein the alkali metal polysulfide is a member selected from the group consisting of sodium polysulfide and potassium polysulfide.

References Cited
UNITED STATES PATENTS

| | | | |
|---|---|---|---|
| 3,322,794 | 5/1967 | Haeberli | 260—343.2 |
| 3,352,885 | 11/1967 | Schellhammer et al. | 260—343.2 |
| 3,356,689 | 12/1967 | Haeberli | 260—343.2 |

HENRY R. JILES, Primary Examiner

J. M. FORD, Assistant Examiner

U.S. Cl. X.R.

252—301.2